US012499831B2

(12) United States Patent
Pyun et al.

(10) Patent No.: US 12,499,831 B2
(45) Date of Patent: Dec. 16, 2025

(54) DRIVING CONTROLLER AND DISPLAY DEVICE INCLUDING THE SAME

(71) Applicant: Samsung Display Co., Ltd., Yongin-Si (KR)

(72) Inventors: Kihyun Pyun, Yongin-si (KR); Dae-Sik Lee, Yongin-si (KR); Seungho Park, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/749,653

(22) Filed: Jun. 21, 2024

(65) Prior Publication Data

US 2025/0140186 A1 May 1, 2025

(30) Foreign Application Priority Data

Oct. 25, 2023 (KR) ........................ 10-2023-0143723

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0819* (2013.01); *G09G 2300/0842* (2013.01); *G09G 2330/021* (2013.01); *G09G 2330/025* (2013.01)

(58) Field of Classification Search
None
See application file for complete search history.

(56) References Cited

U.S. PATENT DOCUMENTS

| | | | | |
|---|---|---|---|---|
| 6,335,715 | B1 | 1/2002 | Lee | |
| 7,986,317 | B2 | 7/2011 | Kim | |
| 10,049,618 | B2 * | 8/2018 | Jeong | G09G 3/3233 |
| 10,218,266 | B2 * | 2/2019 | Park | G09G 3/3208 |
| 2002/0140640 | A1 * | 10/2002 | Watanabe | G09G 3/2944 345/63 |
| 2014/0176014 | A1 * | 6/2014 | Hu | G09G 3/3426 315/307 |

(Continued)

FOREIGN PATENT DOCUMENTS

| | | | |
|---|---|---|---|
| KR | 10-0296787 | B1 | 10/2001 |
| KR | 10-0543031 | B1 | 3/2006 |

(Continued)

*Primary Examiner* — Dorothy Harris
(74) *Attorney, Agent, or Firm* — Innovation Counsel LLP

(57) ABSTRACT

Disclosed is a driving controller which includes a luminance controller calculating a load of an input image signal, an overcurrent control determiner comparing the load and a reference load and outputting an enable signal corresponding to a result of comparing the load and the reference load, a current sensor receiving an input current through a first voltage line transferring a first driving voltage, comparing the input current and a reference current in response to the enable signal, and outputting a first signal corresponding to a result of comparing the input current and the reference current, a switching circuit connected between a second voltage line and a first node and adjusting a current flowing between the second voltage line and the first node in response to a gate control signal, and a current controller outputting the gate control signal corresponding to the current in response to the first signal.

19 Claims, 14 Drawing Sheets

(56) References Cited

U.S. PATENT DOCUMENTS

| | | | | |
|---|---|---|---|---|
| 2020/0202797 | A1* | 6/2020 | Cho | G09G 3/3233 |
| 2021/0201781 | A1* | 7/2021 | Kim | G09G 3/3258 |
| 2021/0256904 | A1* | 8/2021 | Kang | G09G 3/3225 |
| 2021/0383763 | A1* | 12/2021 | Kim | G09G 3/3291 |
| 2022/0254300 | A1* | 8/2022 | Pyun | G09G 3/3233 |
| 2022/0277683 | A1* | 9/2022 | Kang | G09G 3/3258 |
| 2022/0343867 | A1* | 10/2022 | Lee | G09G 3/3208 |
| 2023/0252944 | A1* | 8/2023 | Pyun | G09G 3/3233<br>345/212 |
| 2023/0410714 | A1* | 12/2023 | Pyun | G09G 3/2096 |

FOREIGN PATENT DOCUMENTS

| | | | |
|---|---|---|---|
| KR | 10-0830298 | B1 | 5/2008 |
| KR | 10-2018-0087920 | A | 8/2018 |
| KR | 10-2306070 | B1 | 9/2021 |
| KR | 10-2023-0120153 | A | 8/2023 |

* cited by examiner

DRIVING CONTROLLER AND DISPLAY DEVICE INCLUDING THE SAME

CROSS-REFERENCE TO RELATED APPLICATIONS

This application claims priority under 35 U.S.C. § 119 to Korean Patent Application No. 10-2023-0143723 filed on Oct. 25, 2023, in the Korean Intellectual Property Office, the disclosures of which are incorporated by reference herein in their entireties.

BACKGROUND

Embodiments of the present disclosure described herein relate to a display device including a driving controller.

An electronic device, which provides an image to a user, such as a smartphone, a digital camera, a notebook computer, a navigation system, a monitor, or a smart television includes a display device for displaying the image. The display device generates an image and provides the user with the generated image through a display screen.

The display device includes a display panel and a driving controller for controlling the display panel. As the driving controller provides data signals to the display panel and currents corresponding to the data signals are provided to pixels of the display panel, a given image may be displayed.

SUMMARY

Embodiments of the present disclosure may provide a driving controller capable of preventing excessive power consumption of a display panel and a display device including the same.

According to an embodiment, a driving controller includes a luminance controller that calculates a load of an input image signal, an overcurrent control determiner that compares the load and a reference load and outputs an enable signal corresponding to a result of comparing the load and the reference load, a current sensor that receives an input current through a first voltage line transferring a first driving voltage, compares the input current and a reference current in response to the enable signal, and outputs a first signal corresponding to a result of comparing the input current and the reference current, a switching circuit that is connected between a second voltage line and a first node and adjusts a current flowing between the second voltage line and the first node in response to a gate control signal, and a current controller that outputs the gate control signal corresponding to the current in response to the first signal.

In an embodiment, the switching circuit may include a current adjust transistor connected between the second voltage line and the first node and configured to receive the gate control signal.

In an embodiment, when the current is an overcurrent, the current controller may output the gate control signal such that the current flowing through the current adjust transistor decreases.

In an embodiment, the current adjust transistor may be a field effect transistor.

In an embodiment, the current controller may include a plus voltage generator that outputs a plus voltage in response to the first signal.

In an embodiment, the plus voltage generator may include a transistor including a first electrode, a second electrode, and a gate electrode receiving the first signal, a first resistor connected between a voltage line receiving a power supply voltage and the first electrode of the transistor, and a second resistor connected between the second electrode of the transistor and a ground terminal, and the plus voltage may be a voltage of the second electrode of the transistor.

In an embodiment, the current controller may further include a sensing resistor connected between the first node and a second node, and the current controller may output the gate control signal corresponding to a sum of a voltage of the first node and the plus voltage.

In an embodiment, the current controller may further include a first amplifier that outputs a sensing voltage corresponding to the sum of the voltage of the first node and the plus voltage, and a second amplifier that compares the sensing voltage and a reference voltage and outputs the gate control signal corresponding to a result of comparing the sensing voltage and the reference voltage.

In an embodiment, the overcurrent control determiner may output the enable signal of an active level when the load is smaller than the reference load, and may output the enable signal of an inactive level when the load is greater than the reference load.

In an embodiment, the current sensor may compare the input current and the reference current and output the first signal corresponding to the result of comparing the input current and the reference current when the enable signal is at the active level, and may output the first signal of the inactive level when the enable signal is at the inactive level.

In an embodiment, the second voltage line may transfer a second driving voltage that has a voltage level different from a voltage level of the first driving voltage.

According to an embodiment, a display device includes a display panel including a pixel, a driving controller that is electrically connected to a first voltage line transferring a first driving voltage and a second voltage line transferring a second driving voltage and receives an input image signal and to output an image data signal, and a data driving circuit that provides a data signal corresponding to the image data signal to the display panel. The driving controller includes a luminance controller that calculates a load of the input image signal, an overcurrent control determiner that compares the load and a reference load and outputs an enable signal corresponding to a result of comparing the load and the reference load, a current sensor that receives an input current through the first voltage line, compares the input current and a reference current in response to the enable signal, and outputs a first signal corresponding to a result of comparing the input current and the reference current, a switching circuit that is connected between the second voltage line and a first node and adjusts a current flowing between the second voltage line and the first node in response to a gate control signal, and a current controller that outputs the gate control signal corresponding to the current in response to the first signal.

In an embodiment, the switching circuit may include a current adjust transistor connected between the second voltage line and the first node, and configured to receive the gate control signal.

In an embodiment, when the current is an overcurrent, the current controller may output the gate control signal such that the current flowing through the current adjust transistor decreases.

In an embodiment, the current controller may include a plus voltage generator that outputs a plus voltage in response to the first signal.

In an embodiment, the plus voltage generator may include a transistor including a first electrode, a second electrode, and a gate electrode receiving the first signal, a first resistor connected between a voltage line receiving a power supply voltage and the first electrode of the transistor, and a second resistor connected between the second electrode of the transistor and a ground terminal, and the plus voltage may be a voltage of the second electrode of the transistor.

In an embodiment, the current controller may further include a sensing resistor connected between the first node and a second node, and the current controller may output the gate control signal corresponding to a sum of a voltage of the first node and the plus voltage.

In an embodiment, the current controller may further include a first amplifier that outputs a sensing voltage corresponding to the sum of the voltage of the first node and the plus voltage, and a second amplifier that compares the sensing voltage and a reference voltage and outputs the gate control signal corresponding to a result of comparing the sensing voltage and the reference voltage.

In an embodiment, when the load is smaller than the reference load, the overcurrent control determiner may output the enable signal of an active level. When the load is greater than the reference load, the overcurrent control determiner may output the enable signal of an inactive level. When the enable signal is at the active level, the current sensor may compare the input current and the reference current and outputs the first signal corresponding to the result of comparing the input current and the reference current. When the enable signal is at the inactive level, the current sensor may output the first signal of the inactive level.

In an embodiment, the pixel may be electrically connected to the first voltage line and the second voltage line.

BRIEF DESCRIPTION OF THE FIGURES

The above and other features of the present disclosure will become apparent by describing in detail embodiments thereof with reference to the accompanying drawings.

DETAILED DESCRIPTION

Figure 1:
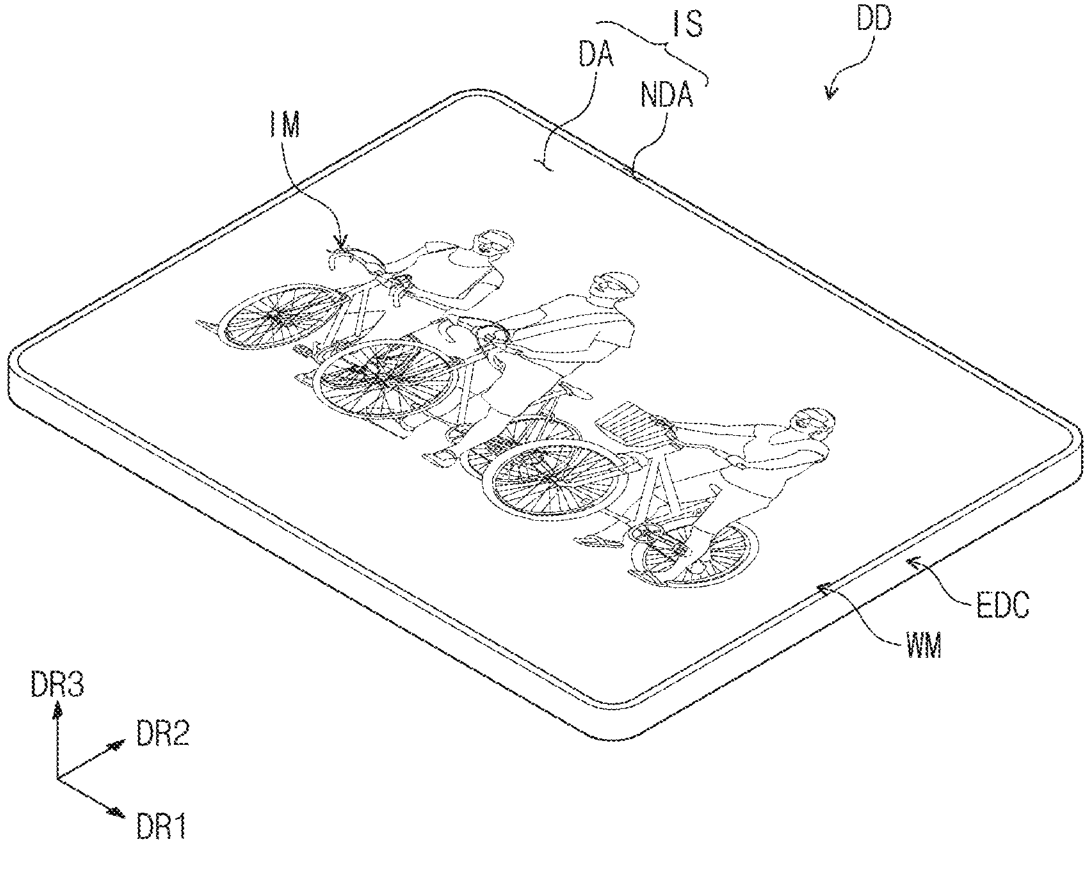
FIG. 1 is a perspective view illustrating a display device according to an embodiment of the present disclosure.

In the specification, the expression that a first component (or region, layer, part, etc.) is "on", "connected to", or "coupled to" a second component means that the first component is directly on, connected to, or coupled to the second component or means that a third component is interposed therebetween.

The same reference numerals/signs refer to the same components. Also, in drawings, the thickness, ratio, and dimension of components are exaggerated for effectiveness of description of technical contents.

The terms "first", "second", etc. are used to describe various components, but the components are not limited by the terms. The terms are only used to distinguish one component from another component. For example, without departing from the scope and spirit of the invention, a first component may be referred to as a "second component", and similarly, the second component may be referred to as the "first component". The singular forms are intended to include the plural forms unless the context clearly indicates otherwise.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to drawings.

Figure 2:
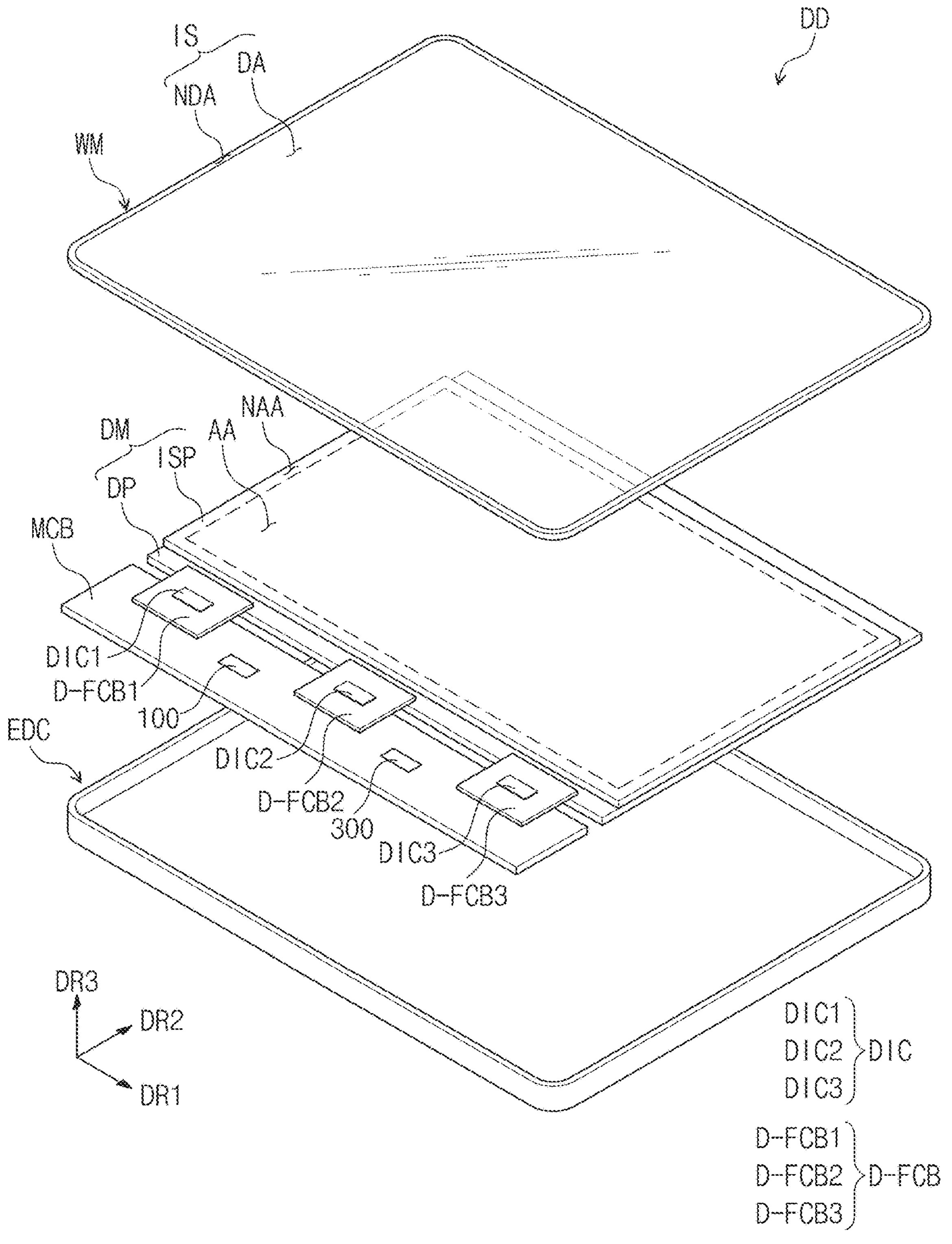
FIG. 2 is an exploded perspective view of a display device, according to an embodiment of the present disclosure.

FIG. 1 is a perspective view of a display device DD according to an embodiment of the present disclosure, and FIG. 2 is an exploded perspective view of the display device DD according to an embodiment of the present disclosure.

Referring to FIGS. 1 and 2, the display device DD may be a device that is activated depending on an electrical signal. The display device DD according to the present disclosure may be a small and medium-sized display device for a mobile phone, a tablet, an automotive navigation system, or a game console, as well as a large-sized display device for a television or a monitor. The above display devices are provided only as an example, and it is obvious that the display device DD may include any other types of display devices without departing from the concept of the invention. The display device DD is in the shape of a rectangle having a long edge (or side) in a first direction DR1 and having a short edge (or side) in a second direction DR2 intersecting the first direction DR1. However, the shape of the display device DD is not limited thereto. For example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD.

In an embodiment, a front surface (or an upper/top surface) and a rear surface (or a lower/bottom surface) of each member are defined with respect to a direction in which the image IM is displayed. The front surface and the rear surface may be opposite to each other in the third direction DR3, and the normal direction of each of the front surface and the rear surface may be parallel to the third direction DR3.

A separation distance between the front surface and the rear surface in the third direction DR3 may correspond to a thickness of the display device DD in the third direction DR3. Meanwhile, directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD according to an embodiment of the present disclosure may sense an external input of a user, which is applied from the outside. The external input of the user may be one of various types of external inputs such as a part of his/her body, a light, heat, his/her eye, or pressure or may be a combination thereof. Also, the display device DD may sense the external input of the user applied to the side surface or rear surface of the display device DD depending on a structure of the display device DD, and the present disclosure is not limited to any one embodiment. As an example of the present disclosure, an external input may include an input entered through an input device (e.g., a stylus pen, an active pen, a touch pen, an electronic pen, or an E-pen).

The display surface IS of the display device DD may be divided into a display area DA and a non-display area NDA. The display area DA may refer to an area in which the image IM is displayed. The user visually perceives the image IM through the display area DA. In an embodiment, the display area DA is illustrated in the shape of a quadrangle whose vertexes are rounded. However, this is illustrated as an example. The display area DA may have various shapes, not limited to an embodiment.

The non-display area NDA is adjacent to the display area DA. The non-display area NDA may have a given color. The non-display area NDA may surround the display area DA. As such, the shape of the display area DA may be defined substantially by the non-display area NDA. However, this is illustrated as an example. The non-display area NDA may be only disposed adjacent to one side of the display area DA or may be omitted. The display device DD according to an embodiment of the present disclosure may include various embodiments and is not limited to any one embodiment.

As illustrated in FIG. 2, the display device DD may include a display module DM and a window WM disposed on or over the display module DM. The display module DM may include a display panel DP and an input sensing layer ISP.

The display panel DP according to an embodiment of the present disclosure may be a light emitting display panel. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, etc. In an embodiment, below, the description will be given under the condition that the display panel DP is an organic light emitting display panel.

The display panel DP may output the image IM, and the output image IM may be displayed through the display surface IS.

The input sensing layer ISP may be disposed on the display panel DP to sense an external input. The input sensing layer ISP may be directly disposed on the display panel DP. According to an embodiment of the present disclosure, the input sensing layer ISP may be formed on the display panel DP in the same process as the display panel DP. That is, in the case where the input sensing layer ISP is directly disposed on the display panel DP, an inner adhesive film (not illustrated) is not disposed between the input sensing layer ISP and the display panel DP. However, the inner adhesive film may be disposed between the input sensing layer ISP and the display panel DP. In this case, the input sensing layer ISP is not manufactured in the same process as the display panel DP. That is, the input sensing layer ISP may be manufactured through a process that is independent of that of the display panel DP and may then be fixed on the upper surface of the display panel DP by the inner adhesive film.

The window WM may be formed of a transparent material capable of outputting the image IM. For example, the window WM may be formed of glass, sapphire, plastic, etc. It is illustrated that the window WM is implemented with a single layer. However, the present disclosure is not limited thereto. For example, the window WM may include a plurality of layers.

Meanwhile, although not illustrated, the non-display area NDA of the display device DD described above may correspond to an area that is defined by printing a material including a given color on one area of the window WM. As an example of the present disclosure, the window WM may include a light blocking (or shielding) pattern for defining the non-display area NDA. The light blocking pattern which is a colored organic film may be formed, for example, in a coating manner.

The window WM may be coupled to the display module DM by an adhesive film. As an example of the present disclosure, the adhesive film may include an optically clear adhesive (OCA) film. However, the adhesive film is not limited thereto. For example, the adhesive film may include a typical adhesive or sticking agent. For example, the adhesive film may include an optically clear resin (OCR) film or a pressure sensitive adhesive (PSA) film.

An anti-reflection layer may be further disposed between the window WM and the display module DM. The anti-reflection layer decreases reflectance of an external light incident from above the window WM. The anti-reflection layer according to an embodiment of the present disclosure may include a phase retarder and a polarizer. The retarder may be of a film type or a liquid crystal coating type. The polarizer may also be of a film type or a liquid crystal coating type. The film type may include a stretch-type synthetic resin film, and the liquid crystal coating type may include liquid crystals arranged in a given direction. The phase retarder and the polarizer may be implemented with one polarization film.

As an example of the present disclosure, the anti-reflection layer may also include color filters. The arrangement of the color filters may be determined in consideration of colors of lights generated from a plurality of pixels PX (see FIG. 3) included in the display panel DP. Also, the anti-reflection layer may further include a light blocking pattern.

The display module DM may display the image IM depending on an electrical signal and may transmit/receive information about an external input. The display module DM may be defined by an effective area AA and a non-effective area NAA. The effective area AA may be defined as an area through which the image IM provided from the display module DM is output. Also, the effective area AA may be defined as an area in which the input sensing layer ISP senses an external input applied from the outside.

The non-effective area NAA is adjacent to the effective area AA. For example, the non-effective area NAA may surround the effective area AA. However, this is illustrated as an example. For example, the non-effective area NAA may be defined in various shapes, not limited to any one embodiment. According to an embodiment, the effective area AA of the display module DM may correspond to at least a portion of the display area DA.

The display device DD may further include a main circuit board MCB, flexible circuit films D-FCB, driver chips DIC, a driving controller 100, and a voltage generator 300. The main circuit board MCB may be connected to the flexible circuit films D-FCB so as to be electrically connected to the display panel DP. The flexible circuit films D-FCB are connected to the display panel DP to electrically connect the display panel DP to the main circuit board MCB. The main circuit board MCB may include a plurality of driving elements. The plurality of driving elements may include a circuit unit for driving the display panel DP. The driver chips DIC may be mounted on the flexible circuit films D-FCB.

As an example of the present disclosure, the flexible circuit films D-FCB may include a first flexible circuit film D-FCB1, a second flexible circuit film D-FCB2, and a third flexible circuit film D-FCB3. The driver chips DIC may include a first driver chip DIC1, a second driver chip DIC2, and a third driver chip DIC3. The first to third flexible circuit films D-FCB1, D-FCB2, and D-FCB3 may be disposed to be spaced from each other in the first direction DR1 and may be connected to the display panel DP to electrically connect the display panel DP and the main circuit board MCB. The first driver chip DIC1 may be mounted on the first flexible circuit film D-FCB1. The second driver chip DIC2 may be mounted on the second flexible circuit film D-FCB2. The third driver chip DIC3 may be mounted on the third flexible circuit film D-FCB3. However, the present disclosure is not limited thereto. For example, the display panel DP may be electrically connected to the main circuit board MCB through one flexible circuit film, and only one driver chip may be mounted on the one flexible circuit film. Also, the display panel DP may be electrically connected to the main circuit board MCB through four or more flexible circuit films, and driver chips may be respectively mounted on the flexible circuit films.

A structure in which the first to third driver chips DIC1, DIC2, and DIC3 are respectively mounted on the first to third flexible circuit films D-FCB1, D-FCB2, and D-FCB3 is illustrated in FIG. 2, but the present disclosure is not limited thereto. For example, the first to third driver chips DIC1, DIC2, and DIC3 may be directly mounted on the display panel DP. In this case, a portion of the display panel DP, on which the first to third driver chips DIC1, DIC2, and DIC3 are mounted, may be bent such that the first to third driver chips DIC1, DIC2, and DIC3 are disposed on the rear surface of the display module DM. Also, the first to third driver chips DIC1, DIC2, and DIC3 may be directly mounted on the main circuit board MCB.

The input sensing layer ISP may be electrically connected to the main circuit board MCB through the flexible circuit films D-FCB. However, the present disclosure is not limited thereto. That is, the display module DM may additionally include a separate flexible circuit film for electrically connecting the input sensing layer ISP and the main circuit board MCB.

In an embodiment, the driving controller 100 and the voltage generator 300 may be mounted on the main circuit board MCB. The driving controller 100 and the voltage generator 300 may be electrically connected to the display panel DP through the main circuit board MCB and the flexible circuit films D-FCB.

The display device DD further includes an outer case EDC accommodating the display module DM. The outer case EDC may be coupled to the window WM to define the exterior of the display device DD. The outer case EDC may absorb external shocks and may prevent a foreign material/moisture or the like from being infiltrated into the display module DM such that components accommodated in the outer case EDC are protected. Meanwhile, as an example of the present disclosure, the outer case EDC may be provided in the form of a combination of a plurality of accommodating members.

Figure 3:
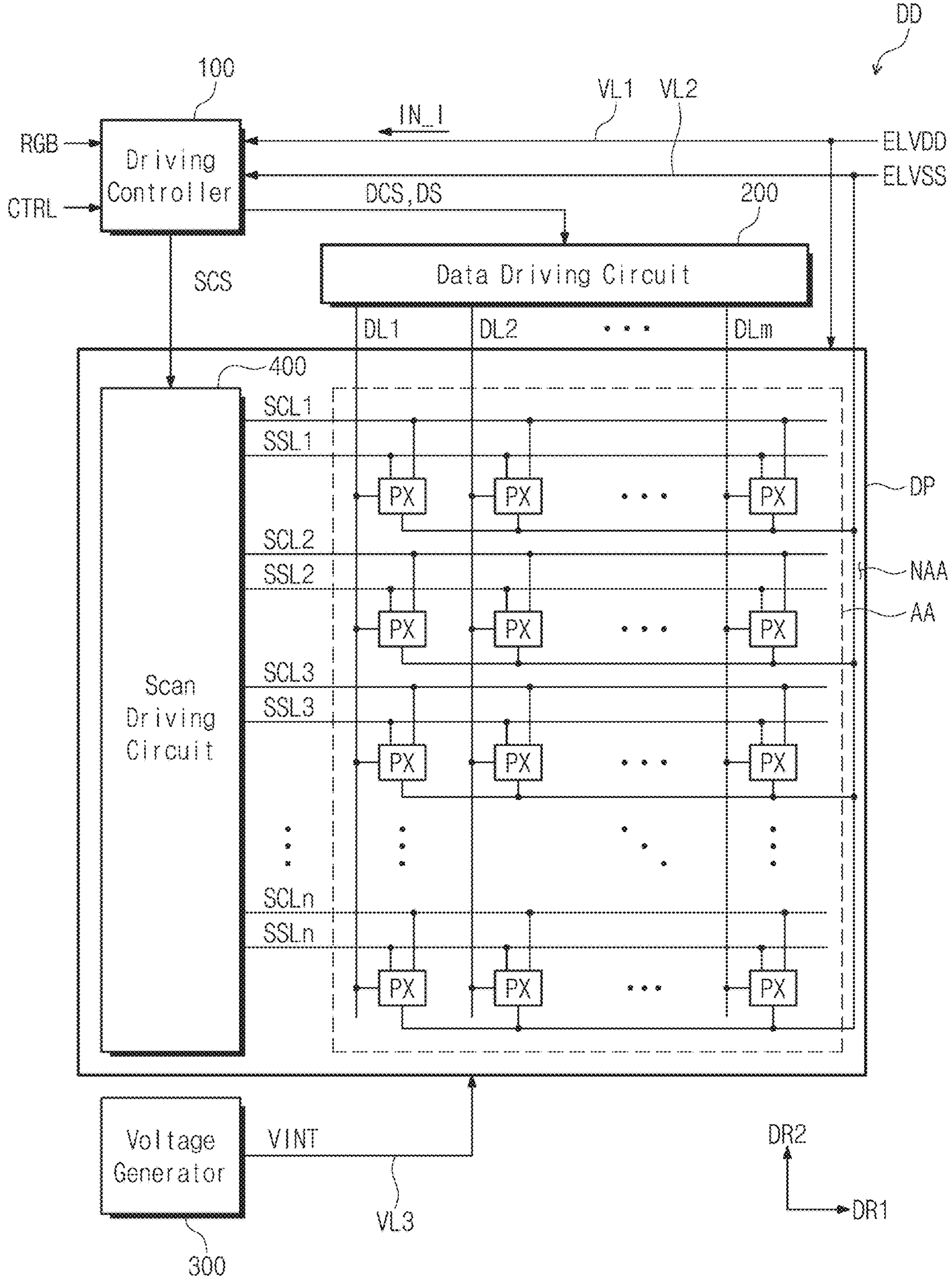
FIG. 3 is a block diagram of a display device according to an embodiment of the present disclosure.

FIG. 3 is a block diagram of a display device according to an embodiment of the present disclosure.

Referring to FIG. 3, the display device DD includes the driving controller 100, a data driving circuit 200, the voltage generator 300, a scan driving circuit 400, and the display panel DP. The driving controller 100, the data driving circuit 200, and the scan driving circuit 400 may be referred to as a driving circuit providing data signals to the pixels PX of the display panel DP.

The driving controller 100 receives an input image signal RGB and a control signal CTRL. The driving controller 100 converts and outputs the input image signal RGB into an image data signal DS. The driving controller 100 outputs a scan control signal SCS and a data control signal DCS.

The data driving circuit 200 receives the data control signal DCS and the image data signal DS from the driving controller 100. The data driving circuit 200 converts the image data signal DS into data signals and then outputs the data signals to a plurality of data lines DL1 to DLm to be described later. The data signals are analog voltages corresponding to a gray value of the image data signal DS. The data driving circuit 200 may be disposed in the driver chips DIC illustrated in FIG. 2.

The display panel DP includes first scan lines SCL1 to SCLn, second scan lines SSL1 to SSLn, the data lines DL1 to DLm, and the pixels PX.

The display panel DP may be divided into the effective area AA and the non-effective area NAA. The pixels PX may be disposed in the effective area AA, and the scan driving circuit 400 may be disposed in the non-effective area NAA.

The first scan lines SCL1 to SCLn and the second scan lines SSL1 to SSLn are arranged to be spaced from each other in the second direction DR2. The data lines DL1 to DLm extend from the data driving circuit 200 in a direction facing away from the second direction DR2 and are arranged to be spaced from each other in the first direction DR1.

The plurality of pixels PX are electrically connected to the first scan lines SCL1 to SCLn, the second scan lines SSL1 to SSLn, and the data lines DL1 to DLm. For example, pixels belonging to the first row may be connected to the scan lines SCL1 and SSL1. Also, pixels belonging to the second row may be connected to the scan lines SCL2 and SSL2.

Each of the plurality of pixels PX includes a light emitting element ED (refer to FIG. 4) and a pixel circuit PXC (refer to FIG. 4) for controlling the emission of the light emitting element ED. The pixel circuit PXC may include a plurality of transistors and a capacitor. The scan driving circuit 400 may include transistors formed through the same process as the pixel circuit PXC. In an embodiment, the light emitting element ED may be an organic light emitting diode. However, the present disclosure is not limited thereto.

Each of the plurality of pixels PX receives a first driving voltage ELVDD, a second driving voltage ELVSS, and an initialization voltage VINT.

The scan driving circuit 400 receives the scan control signal SCS from the driving controller 100. In response to the scan control signal SCS, the scan driving circuit 400 may output first scan signals to the first scan lines SCL1 to SCLn and may output second scan signals to the second scan lines SSL1 to SSLn.

In an embodiment, the scan driving circuit 400 may be disposed in the non-effective area NAA adjacent to the first side of the effective area AA. The first scan lines SCL1 to SCLn and the second scan lines SSL1 to SSLn extend from the scan driving circuit 400 in the first direction DR1.

In another embodiment, scan driving circuits may be respectively disposed on the first side and the second side of the effective area AA. For example, the scan driving circuit disposed on the first side of the effective area AA may provide the first scan signals to the first scan lines SCL1 to SCLn, and the scan driving circuit disposed on the second side of the effective area AA may provide the second scan signals to the second scan lines SSL1 to SSLn.

The voltage generator 300 generates voltages necessary in the operation of the display panel DP. In an embodiment, the voltage generator 300 generates the initialization voltage VINT necessary in the operation of the display panel DP. As well as the initialization voltage VINT, the voltage generator 300 may further generate various voltages necessary in the operations of the display panel DP, the driving controller 100, the data driving circuit 200, and the scan driving circuit 400.

In an embodiment, the display device DD receives the first driving voltage ELVDD and the second driving voltage ELVSS from the outside (e.g., a host processor, a main processor, or a graphics processor) through a first voltage line VL1 and a second voltage line VL2. The first driving voltage ELVDD and the second driving voltage ELVSS may be provided to the display panel DP and the driving controller 100. In an embodiment, a voltage level of the first driving voltage ELVDD may be higher than a voltage level of the second driving voltage ELVSS.

Figure 4:
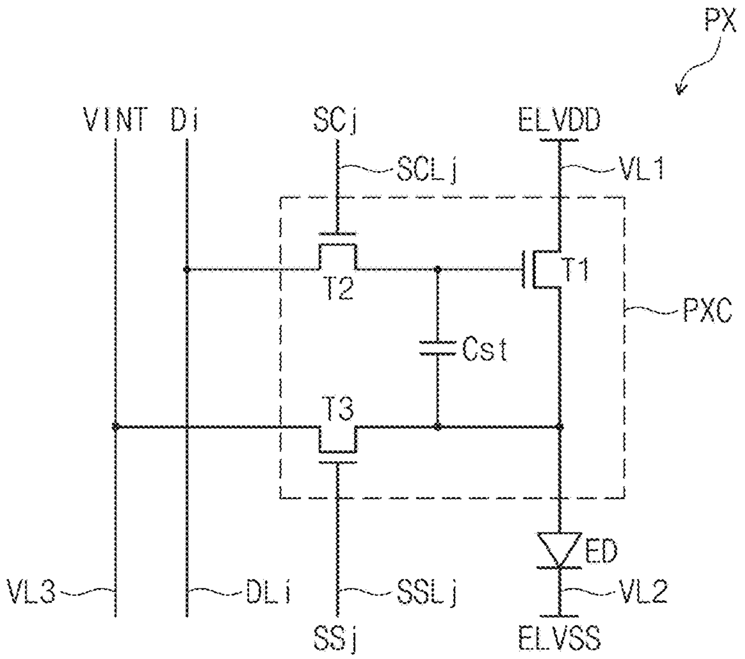
FIG. 4 is an equivalent circuit diagram of a pixel according to an embodiment of the present disclosure.

FIG. 4 is a circuit diagram of a pixel according to an embodiment of the present disclosure.

The pixel PX includes the light emitting element ED and the pixel circuit PXC. The pixel PX is connected to the i-th data line DLi among the data lines DL1 to DLm (refer to FIG. 3), the j-th first scan line SCLj among the first scan lines SCL1 to SCLn (refer to FIG. 3), and the j-th second scan line SSLj among the second scan lines SSL1 to SSLn (refer to FIG. 3). Each of the pixels PX illustrated in FIG. 1 may have the same circuit configuration as the circuit diagram of the pixel PX illustrated in FIG. 4.

The pixel circuit PXC may include at least one transistor which is electrically connected to the light emitting element ED and is used to provide a current corresponding to a data signal Di transferred from the data line DLi to the light emitting element ED. In an embodiment, the pixel circuit PXC includes a first transistor T1, a second transistor T2, a third transistor T3, and a capacitor Cst. Each of the first to third transistors T1 to T3 is an N-type transistor by using an oxide semiconductor as a semiconductor layer. However, the present disclosure is not limited thereto. For example, each of the first to third transistors T1 to T3 may be a P-type transistor having a low-temperature polycrystalline silicon (LTPS) semiconductor layer. In an embodiment, at least one of the first to third transistors T1 to T3 may be an N-type transistor, and the others thereof may be P-type transistors. Also, a circuit configuration of a pixel according to the present disclosure is not limited to FIG. 4. The pixel circuit PXC illustrated in FIG. 4 is only an example. For example, the configuration of the pixel circuit PXC may be modified and implemented.

Referring to FIG. 4, the first scan line SCLj may transfer a first scan signal SCj, and the second scan line SSLj may transfer a second scan signal SSj. The data line DLi transfers the data signal Di. The data signal Di may have a voltage level corresponding to the input image signal RGB which is input to the display device DD (refer to FIG. 1).

The first voltage line VL1 and a third voltage line VL3 may transfer the first driving voltage ELVDD and the initialization voltage VINT to the pixel circuit PXC, and the second voltage line VL2 may transfer the second driving voltage ELVSS to a cathode (or a second terminal) of the light emitting element ED.

The first transistor T1 includes a first electrode connected to the first voltage line VL1, a second electrode electrically connected to an anode (or a first terminal) of the light emitting element ED, and a gate electrode connected to a first electrode of the capacitor Cst. The first transistor T1 may supply a driving current to the light emitting element ED in response to the data signal Di transferred through the data line DLi depending on a switching operation of the second transistor T2.

The second transistor T2 includes a first electrode connected to the data line DLi, a second electrode connected to the gate electrode of the first transistor T1, and a gate electrode connected to the first scan line SCLj. The second transistor T2 may be turned on depending on the first scan signal SCj transferred through the first scan line SCLj and may transfer the data signal Di from the data line DLi to the gate electrode of the first transistor T1.

The third transistor T3 includes a first electrode connected to the third voltage line VL3, a second electrode connected to the anode of the light emitting element ED, and a gate electrode connected to the second scan line SSLj. The third transistor T3 may be turned on depending on the second scan signal SSj transferred through the second scan line SSLj and may transfer the initialization voltage VINT to the anode of the light emitting element ED.

The first electrode of the capacitor Cst is connected to the gate electrode of the first transistor T1 as described above, and a second electrode of the capacitor Cst is connected to the second electrode of the first transistor T1. The structure of the pixel PX according to an embodiment is not limited to the structure illustrated in FIG. 4. In the pixel PX, the number of transistors, the number of capacitors, and a connection relationship of the transistors and the capacitors may be variously changed or modified.

Figure 5:
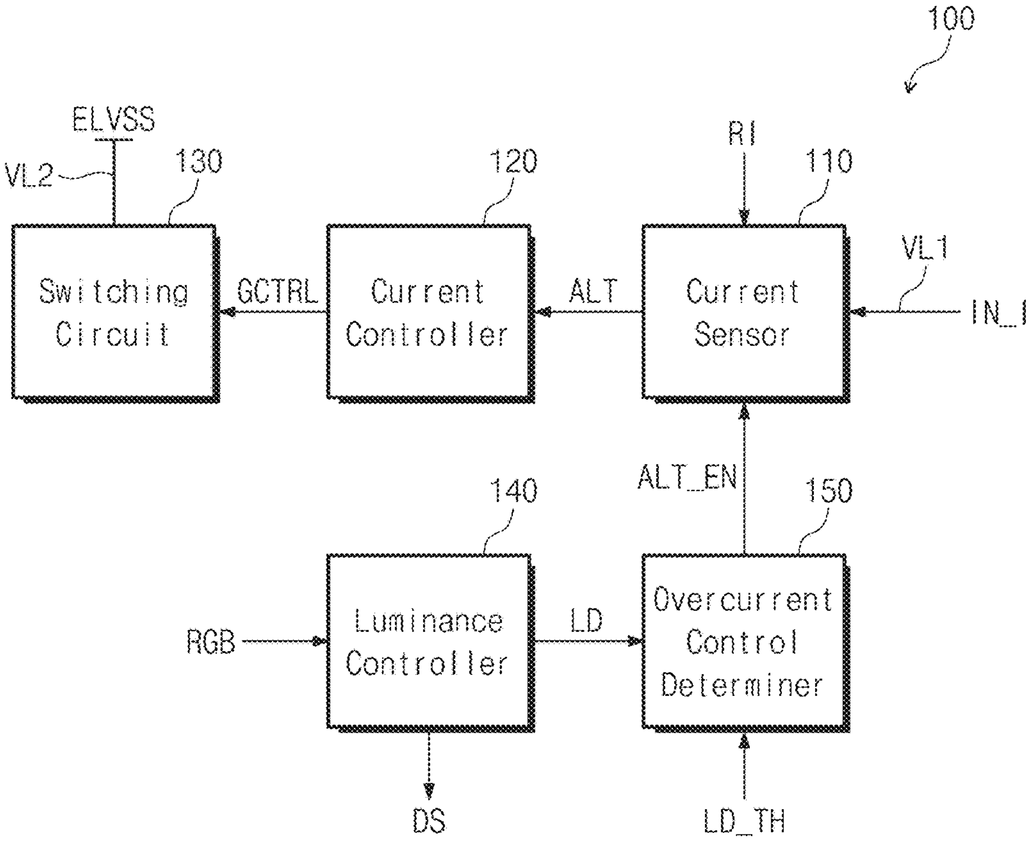
FIG. 5 is a block diagram illustrating a configuration of a driving controller.

FIG. 5 is a block diagram illustrating an embodiment of the driving controller 100.

Components associated only with a voltage control function for adjusting power consumption from among functions of the driving controller 100 are illustrated in FIG. 5. As well as the components illustrated in FIG. 5, the driving controller 100 may further include components associated with various functions (e.g., components associated with a function of converting the input image signal RGB into the image data signal DS and components associated with a function of outputting the scan control signal SCS and the data control signal DCS in response to the control signal CTRL).

Referring to FIG. 5, the driving controller 100 includes a current sensor 110, a current controller 120, a switching circuit 130, a luminance controller 140, and an overcurrent control determiner 150.

The current sensor 110 receives an input current IN_I from the first voltage line VL1. The first voltage line VL1 may be a wiring transferring the first driving voltage ELVDD illustrated in FIG. 3. The current sensor 110 compares the input current IN_I and a reference current RI in response to an enable signal ALT_EN from the overcurrent control determiner 150 and outputs a first signal ALT. The current controller 120 outputs a gate control signal GCTRL in response to the first signal ALT. The switching circuit 130 adjusts a current flowing to the second voltage line VL2 in response to the gate control signal GCTRL.

The luminance controller 140 calculates a load LD of the input image signal RGB. In an embodiment, the luminance controller 140 may adjust the luminance of an image to be displayed in the display panel DP (refer to FIG. 3) depending on the load LD of the input image signal RGB. The luminance controller 140 may output the image data signal DS obtained by adjusting the gray level of the input image signal RGB based on the load LD. The overcurrent control determiner 150 compares the load LD from the luminance controller 140 and a reference load LD_TH and outputs the enable signal ALT_EN corresponding to a comparison result. The enable signal ALT_EN may be provided to the current sensor 110. In an embodiment, when the load LD is smaller than the reference load LD_TH, the overcurrent control determiner 150 outputs the enable signal ALT_EN of an active level. When the load LD is greater than or equal to the reference load LD_TH, the overcurrent control determiner 150 outputs the enable signal ALT_EN of an inactive level.

In an embodiment, the current sensor 110 compares the input current IN_I and the reference current RI while the enable signal ALT_EN from the overcurrent control determiner 150 is at the active level. When a value of the input current IN_I is greater than a value of the reference current RI, the current sensor 110 may output the first signal ALT of the active level.

Figure 6:
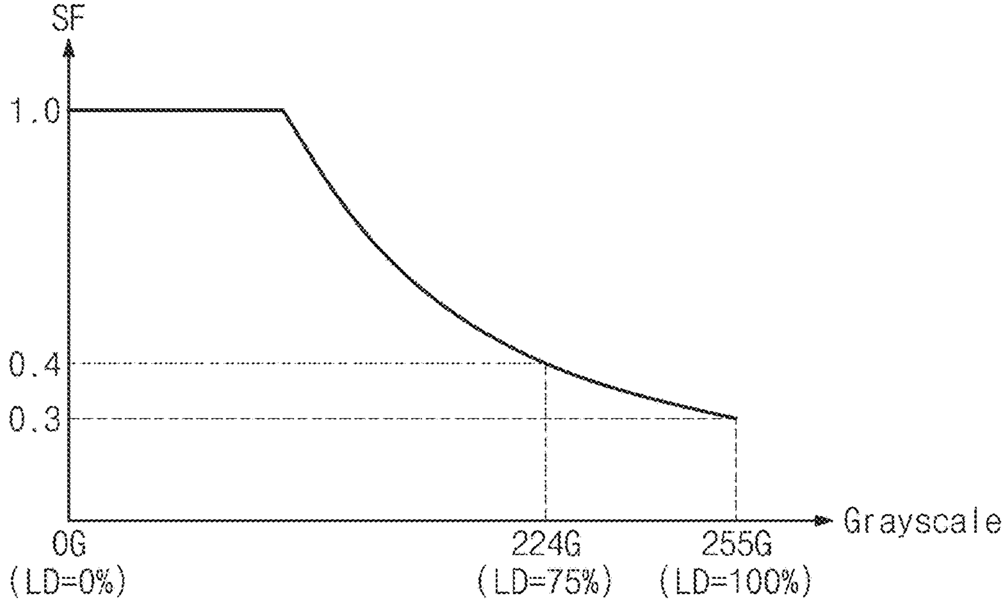
FIG. 6 is a diagram illustrating a scale factor of a luminance controller illustrated in FIG. 5.

FIG. 6 is a diagram illustrating a scale factor SF of the luminance controller 140 illustrated in FIG. 5.

Referring to FIGS. 5 and 6, the luminance controller 140 may calculate the load LD of one frame based on the input image signal RGB. The load LD may have a value between 0% and 100%. For example, when the input image signal RGB corresponds to a full black image (e.g., a 0 gray level), the load LD may be 0%. Also, when the input image signal RGB corresponds to a full white image (e.g., a 255 gray level), the load LD may be 100%.

The luminance controller 140 may output the image data signal DS obtained by adjusting the gray level of the input image signal RGB based on the calculated load LD.

To output the image data signal DS by adjusting the gray level of the input image signal RGB, the luminance controller 140 may calculate the scale factor SF. The scale factor SF may have a value which is smaller than or equal to "1". For example, when the scale factor SF is 1, the grayscale of the image data signal DS may be identical to the grayscale of the input image signal RGB. As another example, when the scale factor SF is 0.5, the grayscale of the image data signal DS may decrease to half the grayscale of the input image signal RGB.

In an embodiment, the value of the scale factor SF may be differently set depending on the load LD. For example, as the load LD increases (i.e., becomes closer to 100%), the scale factor SF may decrease; as the load LD decreases (i.e., becomes closer to 0%), the scale factor SF may increase to 1.

The luminance controller 140 may calculate the load LD based on a sum (hereinafter referred to as a "sum gray level") of the input image signal RGB of one frame. Below, when the sum gray level corresponds to the full white image (255G), the scale factor SF may be 0.3. When the sum gray level corresponds to 224G, the scale factor SF may be 0.4. When the sum gray level corresponds to the full black image (0G), the scale factor SF may be 1. Herein, "G" means a gray level.

When the sum gray level of the input image signal RGB indicates a high gray level, that is, when it is expected that the power consumption of the display panel DP is high, the luminance controller 140 decreases the gray level of the image data signal DS depending on the scale factor SF, so as to be lower than the gray level of the input image signal RGB. As a result, it may be possible to prevent the display panel DP (refer to FIG. 3) from being damaged due to the overcurrent.

Referring to FIG. 5, when the load LD is greater than a given value, the luminance controller 140 may output the image data signal DS whose gray level is adjusted (i.e., is decreased) depending on the scale factor SF. Accordingly, the current consumption of the display panel DP (refer to FIG. 3) may decrease.

When the load LD is greater than or equal to the reference load LD_TH, the overcurrent control determiner 150 outputs the enable signal ALT_EN of the inactive level. When the load LD is smaller than the reference load LD_TH, the overcurrent control determiner 150 outputs the enable signal ALT_EN of the active level.

The current sensor 110 outputs the first signal ALT of the inactive level while the enable signal ALT_EN from the overcurrent control determiner 150 is at the inactive level. The current sensor 110 compares the input current IN_I and the reference current RI while the enable signal ALT_EN from the overcurrent control determiner 150 is at the active level. When the enable signal ALT_EN is at the active level and the value of the input current IN_I is greater than the value of the reference current RI, the current sensor 110 may output the first signal ALT of the active level.

Figure 7:
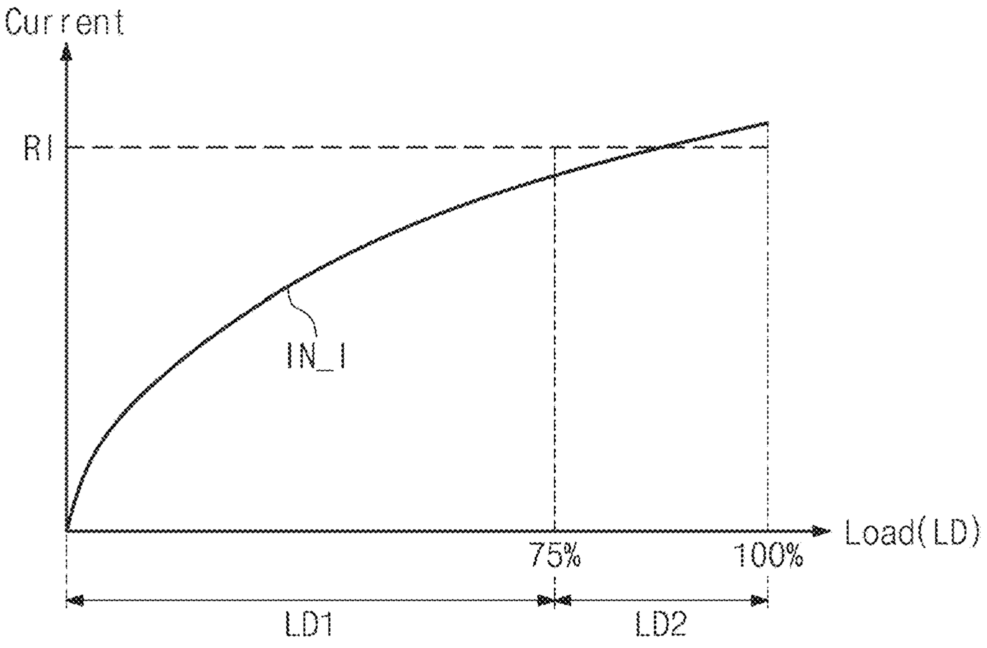
FIG. 7 is a diagram illustrating an input current according to a load.

FIG. 7 is a diagram illustrating the input current IN_I according to the load LD.

Referring to FIGS. 3, 5, and 7, because the luminance of an image to be displayed in the display panel DP becomes higher as the load LD becomes greater, the amount of input current IN_I to be input through the first voltage line VL1 increases.

The input current IN_I may be lower than the reference current RI in a first load interval LD1 in which the load LD is smaller than or equal to the reference load LD_TH (e.g., 75%). The input current IN_I may be higher than the reference current RI in a second load interval LD2 in which the load LD is greater than the reference load LD_TH.

Figure 8:
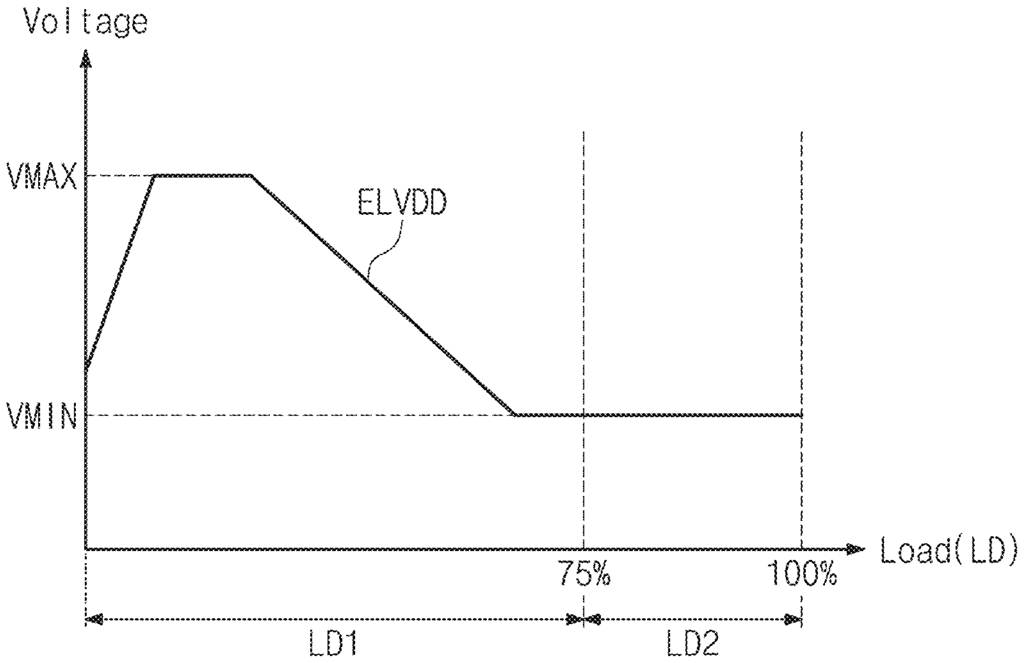
FIG. 8 is a diagram illustrating a first driving voltage according to a load.

FIG. 8 is a diagram illustrating the first driving voltage ELVDD according to the load LD.

Referring to FIGS. 3, 5, and 8, the voltage level of the first driving voltage ELVDD may change depending on the load LD. In an embodiment, the first driving voltage ELVDD may increase to a maximum voltage VMAX in the first load interval LD1 in which the load LD is smaller than or equal to the reference load LD_TH (e.g., 75%). In an embodiment, the first driving voltage ELVDD may be maintained at a minimum voltage VMIN in the second load interval LD2 in which the load LD is greater than the reference load LD_TH.

The power consumption of the display panel DP may be calculated by the product of the input current IN_I and the first driving voltage ELVDD. For example, in the second load interval LD2, when the input current IN_I is 20 A and the first driving voltage ELVDD is 18 V, the power consumption may be 360 W (=20 A×18 V). For example, in the first load interval LD1, when the input current IN_I is 18 A and the first driving voltage ELVDD is 24 V, the power consumption may be 432 W (=18 A×24 V).

In the second load interval LD2, because the first driving voltage ELVDD is 18 V, the power consumption of the display panel DP may be maintained at a uniform level. However, in the first load interval LD1, even though the input current IN_I is 18 A when an image of luminance having a given level is displayed in a state where the first driving voltage ELVDD increases to the maximum voltage VMAX (e.g., 24 V), power consumption may increase. The above rush power may be out of the specification range of the display device DD and may sometimes damage the display device DD.

Figure 9:
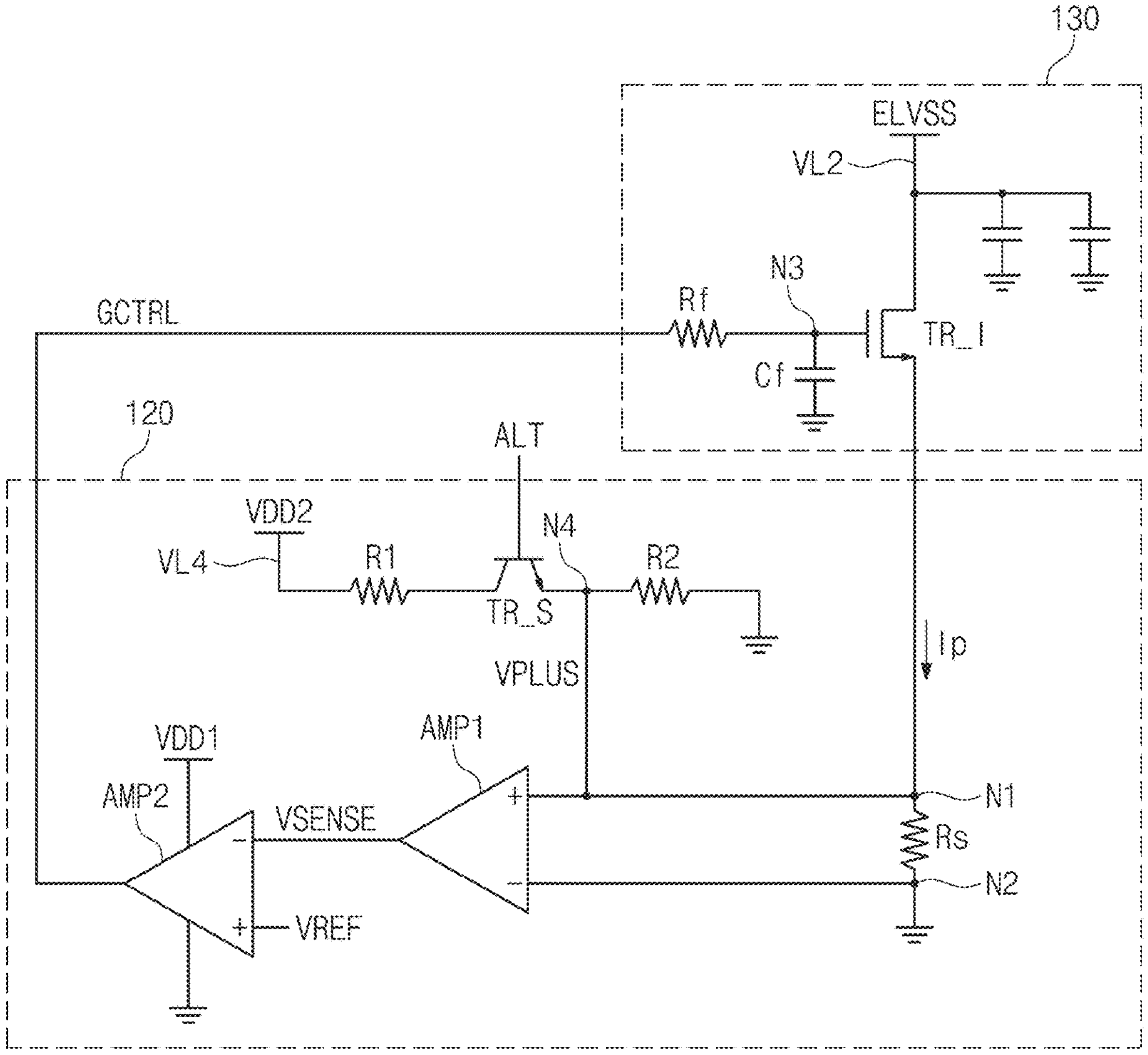
FIG. 9 is a circuit diagram of a current controller and a switching circuit according to an embodiment of the present disclosure.

FIG. 9 is a circuit diagram of the current controller 120 and the switching circuit 130 according to an embodiment of the present disclosure.

Referring to FIG. 9, the switching circuit 130 includes a current adjust transistor TR_I, a resistor Rf, and a capacitor Cf. The current adjust transistor TR_I is connected between the second voltage line VL2 and a first node N1 and includes a gate electrode connected to a third node N3.

The resistor Rf is connected between the current controller 120 and the third node N3. The capacitor Cf is connected between the third node N3 and a ground terminal. The resistor Rf and the capacitor Cf may operate as a low pass filter. The low pass filter may remove a high-frequency component of the gate control signal GCTRL output from the current controller 120 so as to be provided to the third node N3. In an embodiment, the gate control signal GCTRL output from the current controller 120 may be directly provided to the third node N3, that is, the gate electrode of the current adjust transistor TR_I.

The current controller 120 includes a sensing resistor Rs, a first resistor R1, a second resistor R2, a transistor TR_S, a first amplifier AMP1, and a second amplifier AMP2. The sensing resistor Rs is connected between the first node N1 and a second node N2. The second node N2 is connected to the ground terminal. The transistor TR_S includes a first electrode connected to the first resistor R1, a second electrode connected to a fourth node N4, and a gate electrode receiving the first signal ALT. The second node of the transistor TR_S is connected to the first node N1. The gate electrode of the transistor TR_S receives the first signal ALT. The first resistor R1 is connected between a fourth voltage line VL4 and the first electrode of the transistor TR_S. The second resistor R2 is connected between the fourth node N4 and the ground terminal. In an embodiment, the fourth voltage line VL4 receives a second power supply voltage VDD2.

The transistor TR_S is turned off when the first signal ALT input to the gate electrode of the transistor TR_S is at the inactive level (e.g., a low level). When the transistor TR_S is in a turn-off state, a plus voltage VPLUS of the fourth node N4 may be 0 V. The transistor TR_S is turned on when the first signal ALT input to the gate electrode of the transistor TR_S is at the active level (e.g., a high level). When the transistor TR_S is in a turn-on state, the plus voltage VPLUS of the fourth node N4 may be a voltage which is obtained by dividing the second power supply voltage VDD2 by a sum of resistances of the first resistor R1 and the second resistor R2, and then multiplying the result by the resistance of the second resistor. In an embodiment, when the first signal ALT is at the active level, the plus voltage VPLUS of the fourth node N4 may be higher than 0 V and may be lower than the second power supply voltage VDD2. The first resistor R1, the second resistor R2, and the transistor TR_S may be called a plus voltage generator which generates the plus voltage VPLUS in response to the first signal ALT.

The first amplifier AMP1 includes a first input terminal (+) connected to the first node N1 and the fourth node N4, a second input terminal (−) connected to the second node N2, and an output terminal outputting a sensing voltage VSENSE.

The second amplifier AMP2 includes a first input terminal (+) receiving a reference voltage VREF, a second input terminal (−) receiving the sensing voltage VSENSE, and an output terminal outputting the gate control signal GCTRL. The second amplifier AMP2 may receive a first power supply voltage VDD1 and may be connected to the ground terminal.

When the display device DD (refer to FIG. 1) operates, a current Ip may flow between the second voltage line VL2 and the sensing resistor Rs. The first amplifier AMP1 outputs the sensing voltage VSENSE corresponding to a voltage difference between the first node N1 and the second node N2. That is, the sensing voltage VSENSE may be a voltage level corresponding to the current Ip.

The second amplifier AMP2 outputs the gate control signal GCTRL corresponding to a difference of the sensing voltage VSENSE and the reference voltage VREF.

In an embodiment, the current adjust transistor TR_I may be a field effect transistor (FET). The current adjust transistor TR_I may transfer a current corresponding to the voltage level of the gate control signal GCTRL input to the gate electrode of the current adjust transistor TR_I to the first node N1.

FIGS. 10A, 10B, 11A, and 11B are diagrams for describing operations of the current controller 120 and the switching circuit 130 illustrated in FIG. 9.

Figure 10A:
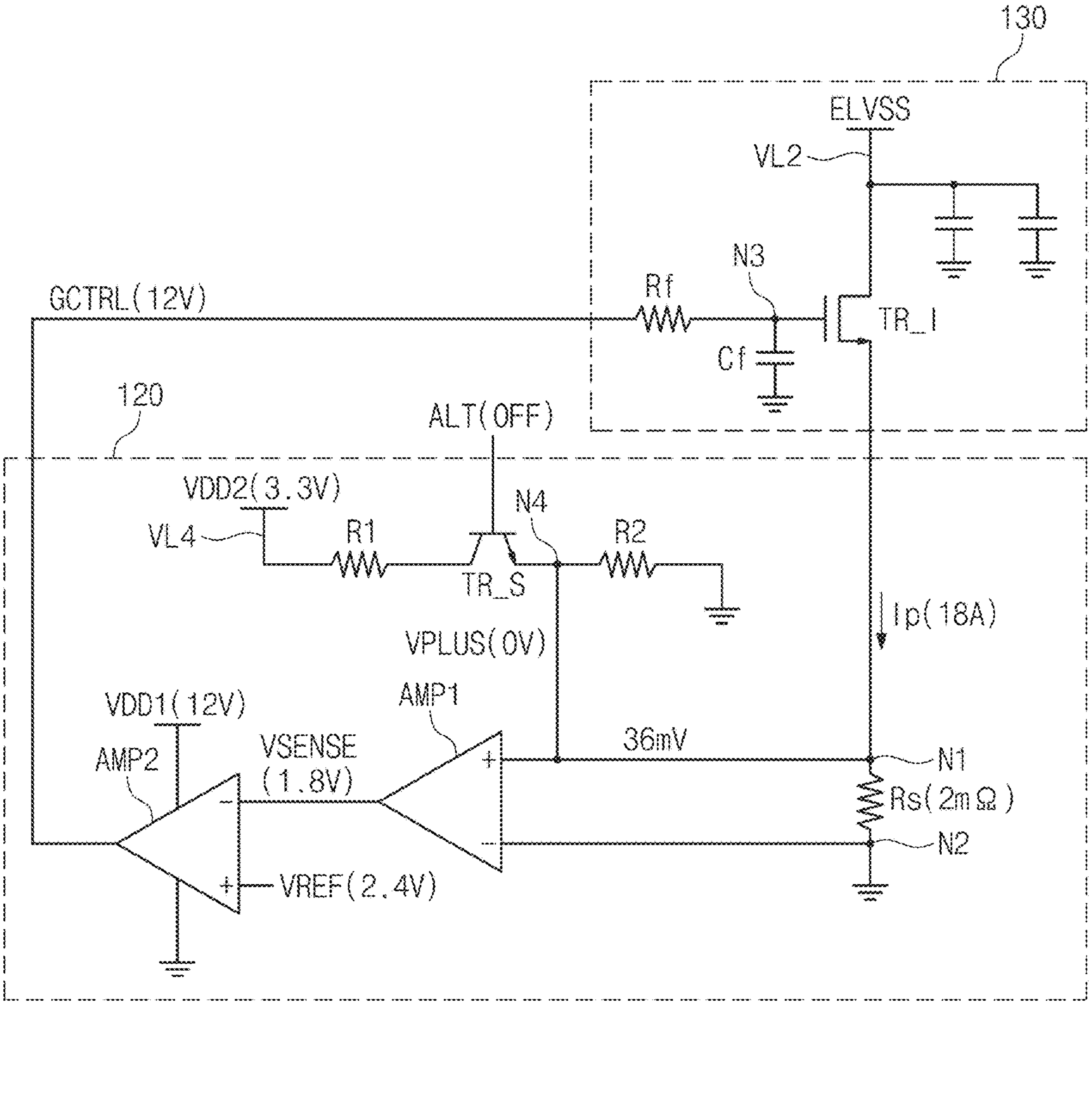
FIGS. 10A, 10B, 11A, and 11B are diagrams for describing operations of a current controller and a switching circuit illustrated in FIG. 9.

FIG. 10A is a diagram for describing operations of the current controller 120 and the switching circuit 130 in the first load interval LD1 in which the first signal ALT is at the inactive level and an overcurrent does not flow to the second voltage line VL2.

Referring to FIGS. 5, 7, and 10A, in the second load interval LD2 in which the load LD is greater than the reference load LD_TH, the overcurrent control determiner 150 outputs the enable signal ALT_EN of the inactive level.

The current sensor 110 outputs the first signal ALT of the inactive level when the enable signal ALT_EN is at the inactive level. When the first signal ALT is at the inactive level, the transistor TR_S maintains a turn-off state.

In this case, when the current Ip between the second voltage line VL2 and the ground terminal is 18 A and the sensing resistor Rs is 2 mΩ, the voltage level of the first input terminal (+) of the first amplifier AMP1 is 36 mV. When the gain of the first amplifier AMP1 is 50, the sensing voltage VSENSE output from the first amplifier AMP1 may be 1.8 V.

When the reference voltage VREF is 2.4 V, because the reference voltage VREF is higher than the sensing voltage VSENSE, the second amplifier AMP2 may output the gate control signal GCTRL corresponding to the voltage level of the first power supply voltage VDD1, that is, 12 V. That is, the voltage level of the gate control signal GCTRL may be 12 V.

The current adjust transistor TR_I may be fully turned on in response to the gate control signal GCTRL of 12 V input to the gate electrode of the current adjust transistor TR_I.

That is, when the overcurrent does not flow to the second voltage line VL2, the current controller 120 and the switching circuit 130 may not adjust the current Ip.

Figure 10B:
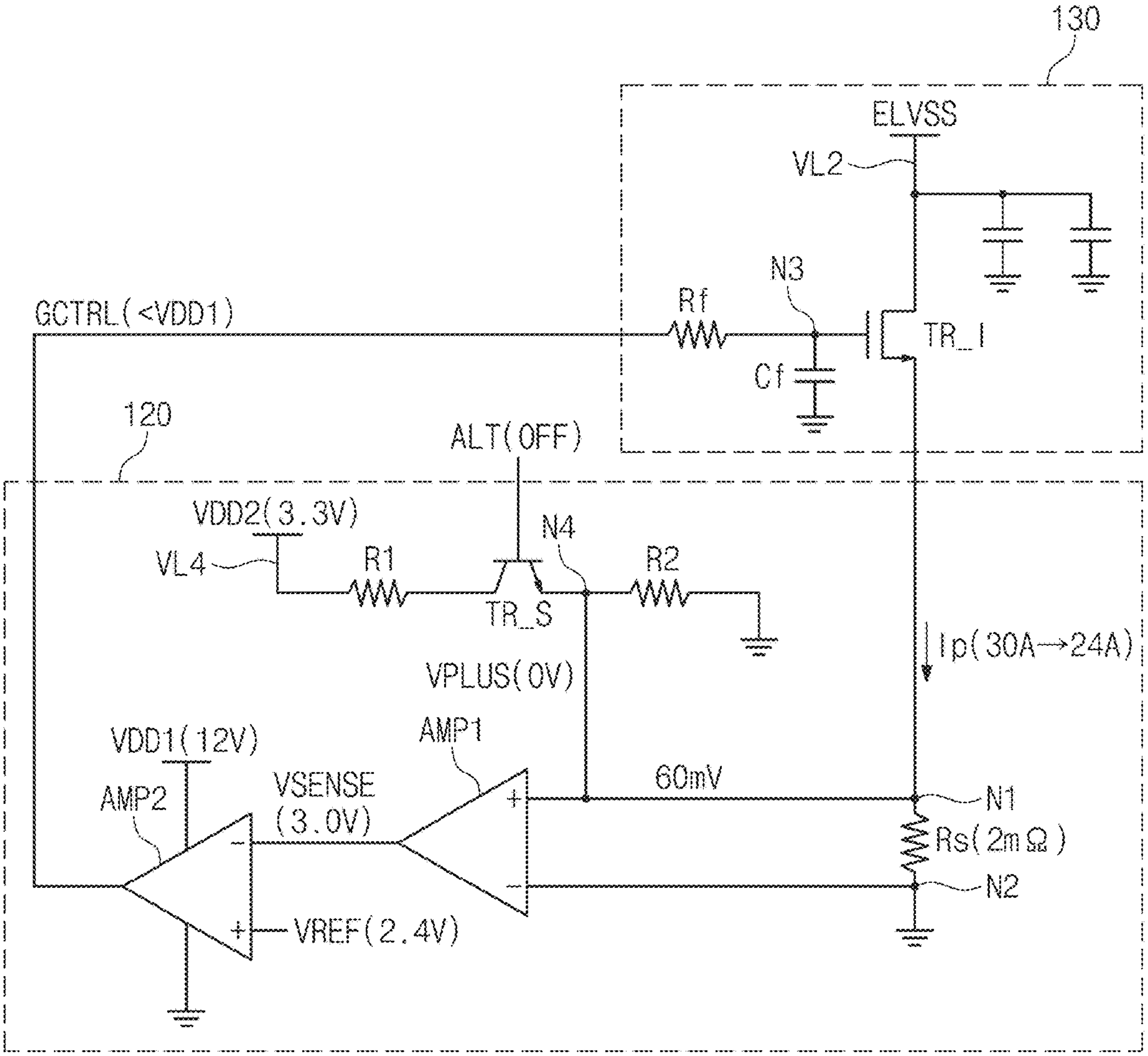

FIG. 10B is a diagram for describing operations of the current controller 120 and the switching circuit 130 in the second load interval LD2 in which the first signal ALT is at the inactive level and an overcurrent flows to the second voltage line VL2.

Referring to FIGS. 5, 7, and 10B, in the second load interval LD2 in which the load LD is greater than the reference load LD_TH, the overcurrent control determiner 150 outputs the enable signal ALT_EN of the inactive level.

The current sensor 110 outputs the first signal ALT of the inactive level when the enable signal ALT_EN is at the inactive level. When the first signal ALT is at the inactive level, the transistor TR_S maintains a turn-off state.

In this case, when the current Ip between the second voltage line VL2 and the ground terminal is 30 A and the sensing resistor Rs is 2 mΩ, the voltage level of the first input terminal (+) of the first amplifier AMP1 is 60 mV. When the gain of the first amplifier AMP1 is 50, the sensing voltage VSENSE output from the first amplifier AMP1 may be 3.0 V.

When the reference voltage VREF is 2.4 V, when the sensing voltage VSENSE is higher than the reference voltage VREF, the voltage level of the gate control signal GCTRL output from the second amplifier AMP2 may be lower than the first power supply voltage VDD1 (GCTRL<12V).

The current adjust transistor TR_I may adjust the current Ip flowing between the second voltage line VL2 and the sensing resistor Rs in response to the gate control signal GCTRL input to the gate electrode of the current adjust transistor TR_I. When the voltage level of the gate control signal GCTRL input to the gate electrode of the current adjust transistor TR_I decreases, the current Ip may decrease.

For example, when the current Ip decreases from 30 A to 24 A, even though the first driving voltage ELVDD is maintained at a uniform voltage, the power consumption of the display panel DP (refer to FIG. 3) may decrease.

That is, when the overcurrent flows to the second voltage line VL2, the current controller 120 and the switching circuit 130 may adjust the current Ip, and thus, power consumption of the display panel DP may be reduced.

Figure 11A:
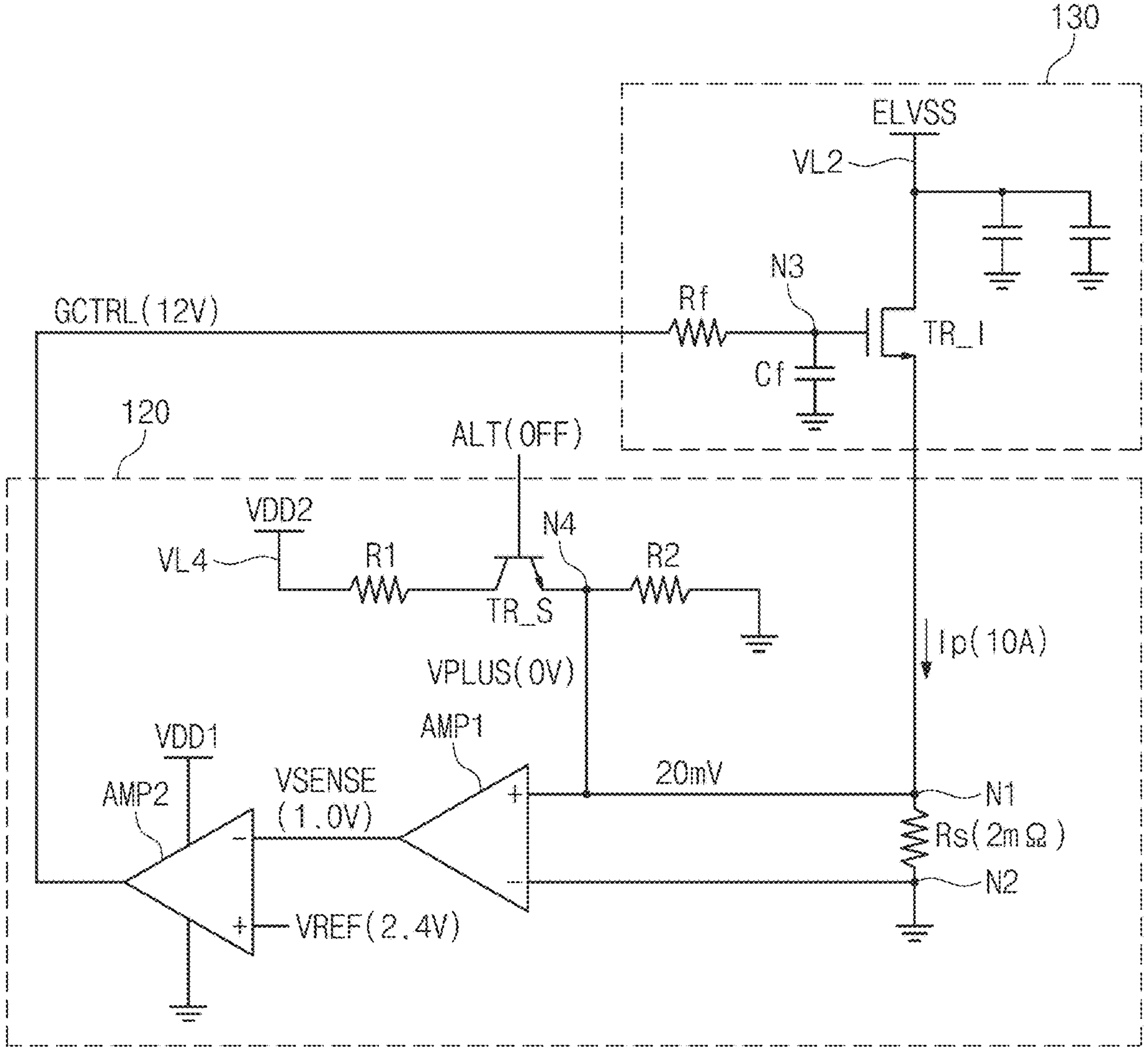

FIG. 11A is a diagram for describing operations of the current controller 120 and the switching circuit 130 in the first load interval LD1 in which an overcurrent does not flow to the second voltage line VL2.

Referring to FIGS. 5, 7, and 11A, in the first load interval LD1 in which the load LD is smaller than the reference load LD_TH, the overcurrent control determiner 150 outputs the enable signal ALT_EN of the active level.

The current sensor 110 compares the input current IN_I and the reference current RI while the enable signal ALT_EN is at the active level. When the input current IN_I is smaller than the reference current RI, the current sensor 110 may output the first signal ALT of the inactive level. When the first signal ALT is at the inactive level, the transistor TR_S maintains a turn-off state.

In this case, when the current Ip between the second voltage line VL2 and the ground terminal is 10 A and the sensing resistor Rs is 2 mΩ, the voltage level of the first input terminal (+) of the first amplifier AMP1 is 20 mV. When the gain of the first amplifier AMP1 is 50, the sensing voltage VSENSE output from the first amplifier AMP1 may be 1.0 V.

When the reference voltage VREF is 2.4 V, because the reference voltage VREF is higher than the sensing voltage VSENSE, the second amplifier AMP2 may output the gate control signal GCTRL corresponding to the voltage level of the first power supply voltage VDD1, that is, 12 V. That is, the voltage level of the gate control signal GCTRL may be 12 V.

The current adjust transistor TR_I may be fully turned on in response to the gate control signal GCTRL of 12 V input to the gate electrode of the current adjust transistor TR_I.

That is, when the overcurrent does not flow to the second voltage line VL2, the current controller 120 and the switching circuit 130 may not adjust the current Ip.

Figure 11B:
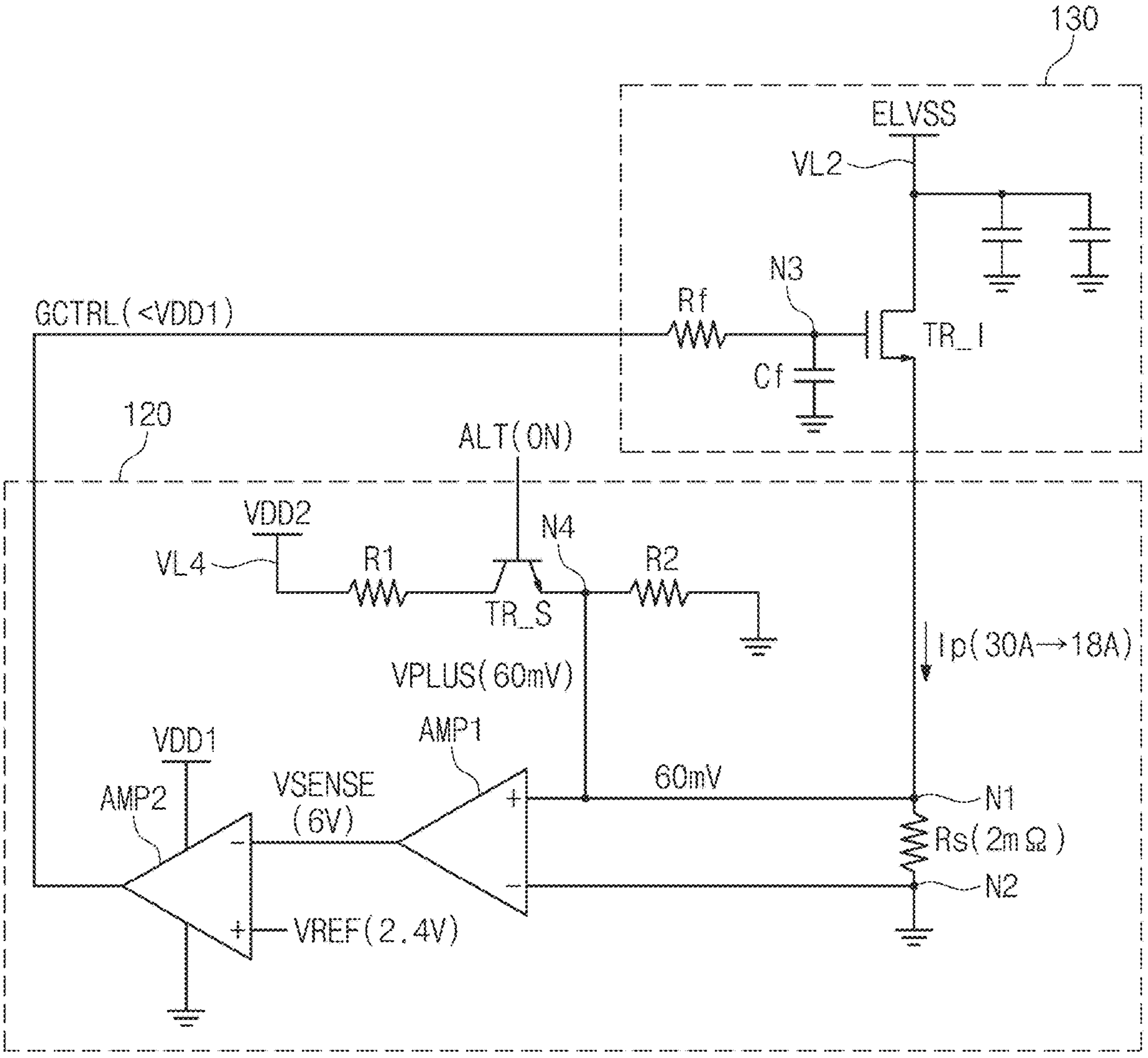

FIG. 11B is a diagram for describing operations of the current controller 120 and the switching circuit 130 in the first load interval LD1 in which an overcurrent flows to the second voltage line VL2.

Referring to FIGS. 5, 7, and 11B, in the first load interval LD1 in which the load LD is smaller than the reference load LD_TH, the overcurrent control determiner 150 outputs the enable signal ALT_EN of the active level.

The current sensor 110 outputs the first signal ALT of the active level when the enable signal ALT_EN is at the active level. When the first signal ALT is at the active level, the transistor TR_S is turned on.

When the transistor TR_S is turned on, a voltage of the fourth node N4 may be a voltage lower than the second power supply voltage VDD2 by the first resistor R1 and the second resistor R2. For example, the voltage of the fourth node N4, that is, the plus voltage VPLUS may be 60 mV.

In this case, when the current Ip between the second voltage line VL2 and the ground terminal is 30 A and the sensing resistor Rs is 2 mΩ, the voltage level of the first node N1 is 60 mV.

The voltage level of the first input terminal (+) of the first amplifier AMP1 may be 120 mV obtained by adding the voltage of the first node N1 and the plus voltage VPLUS of the fourth node N4. When the gain of the first amplifier AMP1 is 50, the sensing voltage VSENSE output from the first amplifier AMP1 may be 6 V.

When the reference voltage VREF is 2.4 V, when the sensing voltage VSENSE is higher than the reference voltage VREF, the voltage level of the gate control signal GCTRL output from the second amplifier AMP2 may be lower than the first power supply voltage VDD1 (GCTRL<VDD1).

The current adjust transistor TR_I may adjust the current Ip flowing between the second voltage line VL2 and the sensing resistor Rs in response to the gate control signal GCTRL input to the gate electrode of the current adjust transistor TR_I. When the voltage level of the gate control signal GCTRL input to the gate electrode of the current adjust transistor TR_I decreases, the current Ip may decrease.

For example, when the current Ip decreases from 30 A to 18 A, even though the first driving voltage ELVDD is maintained at a uniform voltage, the power consumption of the display panel DP (refer to FIG. 3) may decrease.

That is, when the overcurrent flows to the second voltage line VL2, the current controller 120 and the switching circuit 130 may adjust the current Ip, and thus, power consumption of the display panel DP may be reduced.

In FIGS. 10A, 10B, 11A, and 11B, values of the current Ip, the resistance value of the sensing resistor Rs, and the voltage levels of the sensing voltage VSENSE, the reference voltage VREF, the gate control signal GCTRL, and the first power supply voltage VDD1 are provided only as an example, and the present disclosure is not limited thereto.

Figure 12:
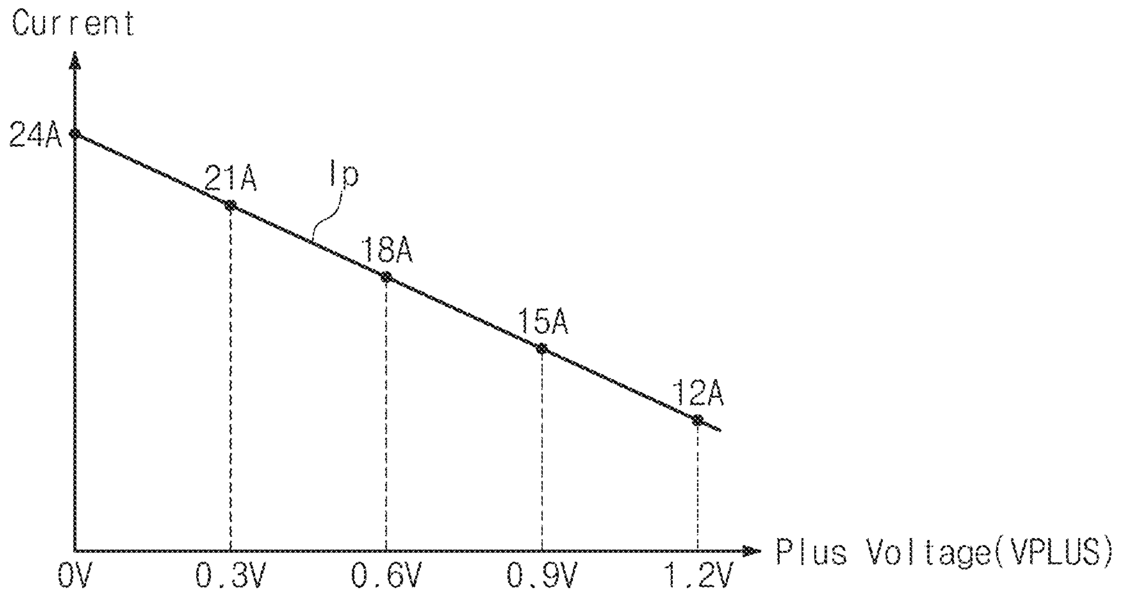
FIG. 12 is a diagram illustrating a change of a current according to a plus voltage.

FIG. 12 is a diagram illustrating a change of the current Ip according to the plus voltage VPLUS.

Referring to FIGS. 11B and 12, the plus voltage VPLUS may be determined by the voltage level of the second power supply voltage VDD2 and resistance values of the first resistor R1 and the second resistor R2.

In the example illustrated in FIG. 11B, when the current Ip is 30 A due to the overcurrent flowing to the second voltage line VL2, the current Ip may be adjusted depending on the voltage level of the plus voltage VPLUS.

For example, when the plus voltage VPLUS is 0 V, 0.3 V, 0.6 V, 0.9 V, or 1.2 V, the current Ip may be adjusted to 24 A, 21 A, 18 A, 15 A, or 12 A.

That is, the power consumption of the display panel DP may be adjusted by setting the resistance values of the first resistor R1 and the second resistor R2 depending on the characteristic of the display panel DP such that the voltage level of the plus voltage VPLUS is optimally set.

Figure 13A:
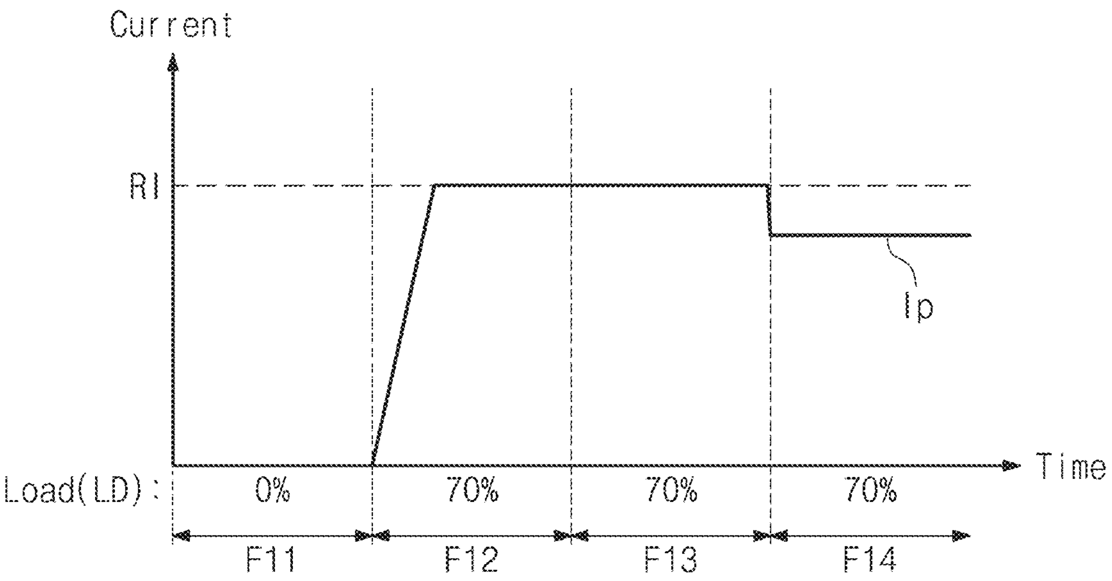
FIGS. 13A and 13B are diagrams illustrating a change of a current according to a plus voltage.
Figure 13B:
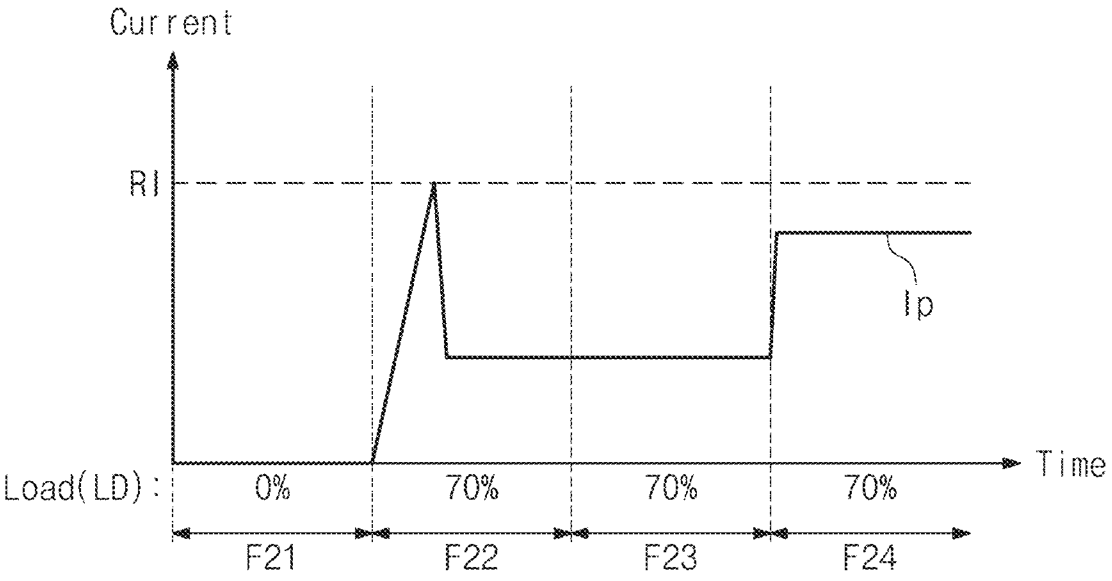

FIGS. 13A and 13B are diagrams illustrating a change of the current Ip according to the plus voltage VPLUS.

FIG. 13A shows an example of a change of the current Ip in 11th to 14th frames F11 to F14 when the plus voltage VPLUS is 0.6 V. FIG. 13B shows an example of a change of the current Ip in 21th to 24th frames F21 to F24 when the plus voltage VPLUS is 1.2 V.

Referring to FIGS. 5, 9, 13A, and 13B, when the load LD is smaller than the reference load LD_TH, the first signal ALT is set to the active level, and thus, the transistor TR_S is turned on.

As illustrated in FIG. 13A, when the plus voltage VPLUS is 0.6 V, at the 12th frame F12 and the 13th frame F13, the current Ip may be 18 A.

As illustrated in FIG. 13B, when the plus voltage VPLUS is 1.2 V, at the 22th frame F22 and the 23th frame F23, the current Ip may be 12 A.

That is, even though the load LD is maintained at the same value of 70%, the current Ip may be adjusted depending on the voltage level of the plus voltage VPLUS.

The voltage level of the plus voltage VPLUS may be determined as an optimal value depending on a characteristic of an image to be displayed in the display panel DP.

Figure 14:
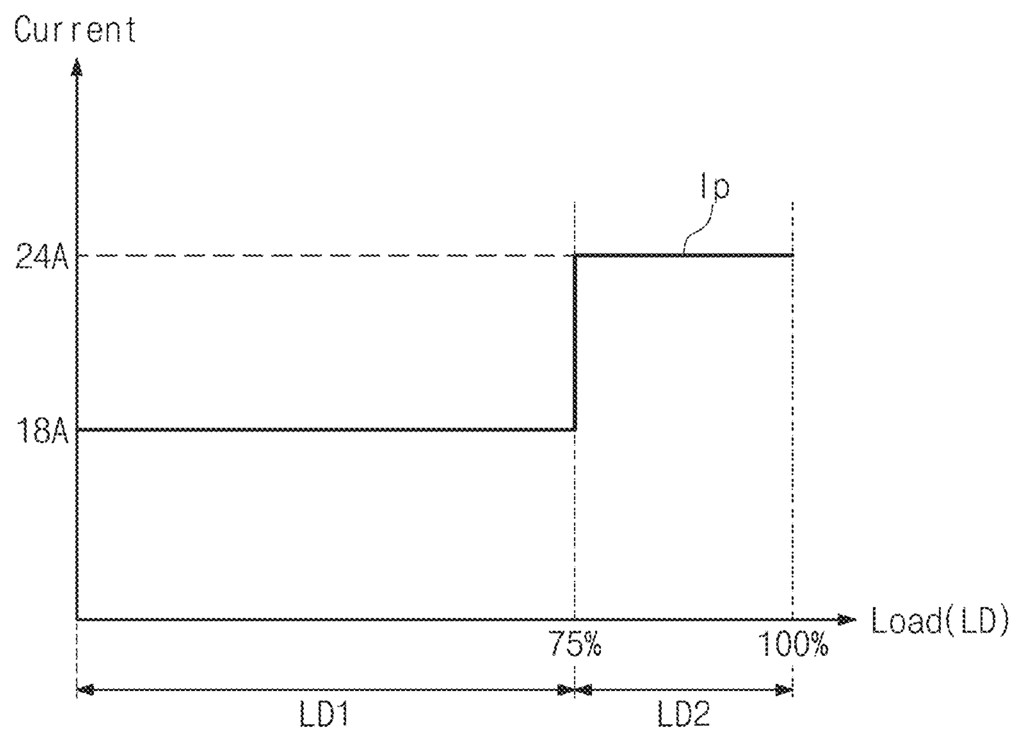
FIG. 14 illustrates an example of a current according to a load.

FIG. 14 illustrates the current Ip according to the load LD.

Referring to FIGS. 8, 9, and 14, in the first load interval LD1 in which the load LD is smaller than or equal to the reference load LD_TH (e.g., 75%), the first driving voltage ELVDD may increase up to the maximum voltage VMAX. Accordingly, the power consumption of the display panel DP in which the current Ip has to be maintained at a low current level (e.g., 18 A) in the first load interval LD1 may be maintained to be lower than a reference level.

In the second load interval LD2 in which the load LD is greater than the reference load LD_TH, the first driving voltage ELVDD may be maintained at the minimum voltage VMIN.

Accordingly, even though the current Ip in the second load interval LD2 is maintained at a current level (e.g., 24 A) somewhat higher than that in the first load interval LD1, the power consumption of the display panel DP may be maintained to be lower than the reference level.

A display device with the above configuration may prevent power consumption of a display panel from exceeding a reference level when a transient overcurrent flows in the display panel. Accordingly, the display panel may be prevented from being damaged due to the sudden increase in power consumption.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A driving controller comprising:

a luminance controller configured to calculate a load of an input image signal;

an overcurrent control determiner configured to compare the load and a reference load, and to output an enable signal corresponding to a result of comparing the load and the reference load;

a current sensor configured to receive an input current through a first voltage line transferring a first driving voltage, to compare the input current and a reference current in response to the enable signal, and to output a first signal corresponding to a result of comparing the input current and the reference current;

a switching circuit connected between a second voltage line and a first node, and configured to adjust a current flowing between the second voltage line and the first node in response to a gate control signal; and a current controller configured to output the gate control signal corresponding to the current in response to the first signal, wherein the current controller includes a plus voltage generator configured to output a plus voltage in response to the first signal, and wherein the current controller outputs the gate control signal corresponding to a sum of a voltage of the first node and the plus voltage.

2. The driving controller of claim 1, wherein the switching circuit includes a current adjust transistor connected between the second voltage line and the first node, and configured to receive the gate control signal.

3. The driving controller of claim 2, wherein, when the current is an overcurrent, the current controller outputs the gate control signal such that the current flowing through the current adjust transistor decreases.

4. The driving controller of claim 2, wherein the current adjust transistor is a field effect transistor.

5. The driving controller of claim 1, wherein the plus voltage generator includes:

a transistor including a first electrode, a second electrode, and a gate electrode receiving the first signal;

a first resistor connected between a voltage line receiving a power supply voltage and the first electrode of the transistor; and a second resistor connected between the second electrode of the transistor and a ground terminal, and wherein the plus voltage is a voltage of the second electrode of the transistor.

6. The driving controller of claim 1, wherein the current controller further includes a sensing resistor connected between the first node and a second node.

7. The driving controller of claim 6, wherein the current controller further includes:

a first amplifier configured to output a sensing voltage corresponding to the sum of the voltage of the first node and the plus voltage; and a second amplifier configured to compare the sensing voltage and a reference voltage and to output the gate control signal corresponding to a result of comparing the sensing voltage and the reference voltage.

8. The driving controller of claim 1, wherein the overcurrent control determiner is configured to:

when the load is smaller than the reference load, output the enable signal of an active level; and when the load is greater than the reference load, output the enable signal of an inactive level.

9. The driving controller of claim 8, wherein the current sensor is configured to:

when the enable signal is at the active level, compare the input current and the reference current and output the first signal corresponding to the result of comparing the input current and the reference current; and when the enable signal is at the inactive level, output the first signal of the inactive level.

10. The driving controller of claim 1, wherein the second voltage line transfers a second driving voltage that has a voltage level different from a voltage level of the first driving voltage.

11. A display device comprising:

a display panel including a pixel;

a driving controller electrically connected to a first voltage line transferring a first driving voltage and a second voltage line transferring a second driving voltage, and configured to receive an input image signal and to output an image data signal; and a data driving circuit configured to provide a data signal corresponding to the image data signal to the display panel, wherein the driving controller includes:

a luminance controller configured to calculate a load of the input image signal;

an overcurrent control determiner configured to compare the load and a reference load, and to output an enable signal corresponding to a result of comparing the load and the reference load;

a current sensor configured to receive an input current through the first voltage line, to compare the input current and a reference current in response to the enable signal, and to output a first signal corresponding to a result of comparing the input current and the reference current;

a switching circuit connected between the second voltage line and a first node, and configured to adjust a current flowing between the second voltage line and the first node in response to a gate control signal; and a current controller configured to output the gate control signal corresponding to the current in response to the first signal, wherein the current controller includes a plus voltage generator configured to output a plus voltage in response to the first signal, and wherein the current controller outputs the gate control signal corresponding to a sum of a voltage of the first node and the plus voltage.

12. The display device of claim 11, wherein the switching circuit includes a current adjust transistor connected between the second voltage line and the first node, and configured to receive the gate control signal.

13. The display device of claim 12, wherein, when the current is an overcurrent, the current controller outputs the gate control signal such that the current flowing through the current adjust transistor decreases.

14. The display device of claim 11, wherein the plus voltage generator includes:

a transistor including a first electrode, a second electrode, and a gate electrode receiving the first signal;

a first resistor connected between a voltage line receiving a power supply voltage and the first electrode of the transistor; and a second resistor connected between the second electrode of the transistor and a ground terminal, and wherein the plus voltage is a voltage of the second electrode of the transistor.

15. The display device of claim 11, wherein the current controller further includes a sensing resistor connected between the first node and a second node.

16. The display device of claim 15, wherein the current controller further includes:

a first amplifier configured to output a sensing voltage corresponding to the sum of the voltage of the first node and the plus voltage; and a second amplifier configured to compare the sensing voltage and a reference voltage and to output the gate control signal corresponding to a result of comparing the sensing voltage and the reference voltage.

17. The display device of claim 11, wherein, when the load is smaller than the reference load, the overcurrent control determiner outputs the enable signal of an active level, wherein, when the load is greater than the reference load, the overcurrent control determiner outputs the enable signal of an inactive level, wherein, when the enable signal is at the active level, the current sensor compares the input current and the reference current and outputs the first signal corresponding to the result of comparing the input current and the reference current, and wherein, when the enable signal is at the inactive level, the current sensor outputs the first signal of the inactive level.

18. The display device of claim 11, wherein the pixel is electrically connected to the first voltage line and the second voltage line.

19. An electronic device comprising:

a display panel including a pixel;

a driving controller electrically connected to a first voltage line transferring a first driving voltage and a second voltage line transferring a second driving voltage, and configured to receive an input image signal and to output an image data signal; and a data driving circuit configured to provide a data signal corresponding to the image data signal to the display panel, wherein the driving controller includes:

a luminance controller configured to calculate a load of the input image signal;

an overcurrent control determiner configured to compare the load and a reference load, and to output an enable signal corresponding to a result of comparing the load and the reference load;

a current sensor configured to receive an input current through the first voltage line, to compare the input current and a reference current in response to the enable signal, and to output a first signal corresponding to a result of comparing the input current and the reference current;

a switching circuit connected between the second voltage line and a first node, and configured to adjust a current flowing between the second voltage line and the first node in response to a gate control signal; and a current controller configured to output the gate control signal corresponding to the current in response to the first signal, wherein the current controller includes a plus voltage generator configured to output a plus voltage in response to the first signal, and wherein the current controller outputs the gate control signal corresponding to a sum of a voltage of the first node and the plus voltage.

* * * * *